United States Patent [19]

Hirata

[11] Patent Number: 5,210,600
[45] Date of Patent: May 11, 1993

[54] EXTRACTION OF FILM IMAGE PARAMETERS IN IMAGE PROCESSING APPARATUS

[75] Inventor: Kunio Hirata, Ebina, Japan
[73] Assignee: Fuji Xerox Co., Ltd., Tokyo, Japan
[21] Appl. No.: 637,126
[22] Filed: Jan. 3, 1991

[30] Foreign Application Priority Data

Jan. 8, 1990 [JP] Japan ................. 2-1283

[51] Int. Cl.$^5$ ................. H04N 1/46; H04N 3/36
[52] U.S. Cl. ................. 358/76; 358/80; 358/474; 358/406
[58] Field of Search ........... 358/76, 406, 80, 474; 382/63

[56] References Cited

U.S. PATENT DOCUMENTS

| 4,329,717 | 5/1982 | Logie et al. | 382/63 |
| 4,656,525 | 4/1987 | Norris | 358/76 |
| 5,060,061 | 10/1991 | Shishido et al. | 358/76 |

FOREIGN PATENT DOCUMENTS

| 0191682 | 10/1984 | Japan | 356/466 |
| 2-189073 | 7/1990 | Japan | |
| 2-275938 | 11/1990 | Japan | |

Primary Examiner—Edward L. Coles, Sr.
Assistant Examiner—Jill Jackson
Attorney, Agent, or Firm—Finnegan, Henderson, Farabow, Garrett & Dunner

[57] ABSTRACT

An imaging unit including a line sensor reads a film image to produce color decomposition data by scanning a plurality of lines on the film image in a stepped prescanning operation. During the prescanning operation, the color decomposition data of a plurality of pixels at each of a plurality of sampling points are sampled and added up on a line-by-line basis, and the added color decomposition data are averaged, where corrections including a shading correction are performed concurrently with the adding and averaging operations. During a period of from the end of the prescanning operation to the start of a main scanning operation, on the basis of the averaged color decomposition data, a density correction amount is determined and parameters to be used for correcting the film image in a succeeding actual image processing operation are calculated. The calculated parameters are set in a line memory.

5 Claims, 8 Drawing Sheets

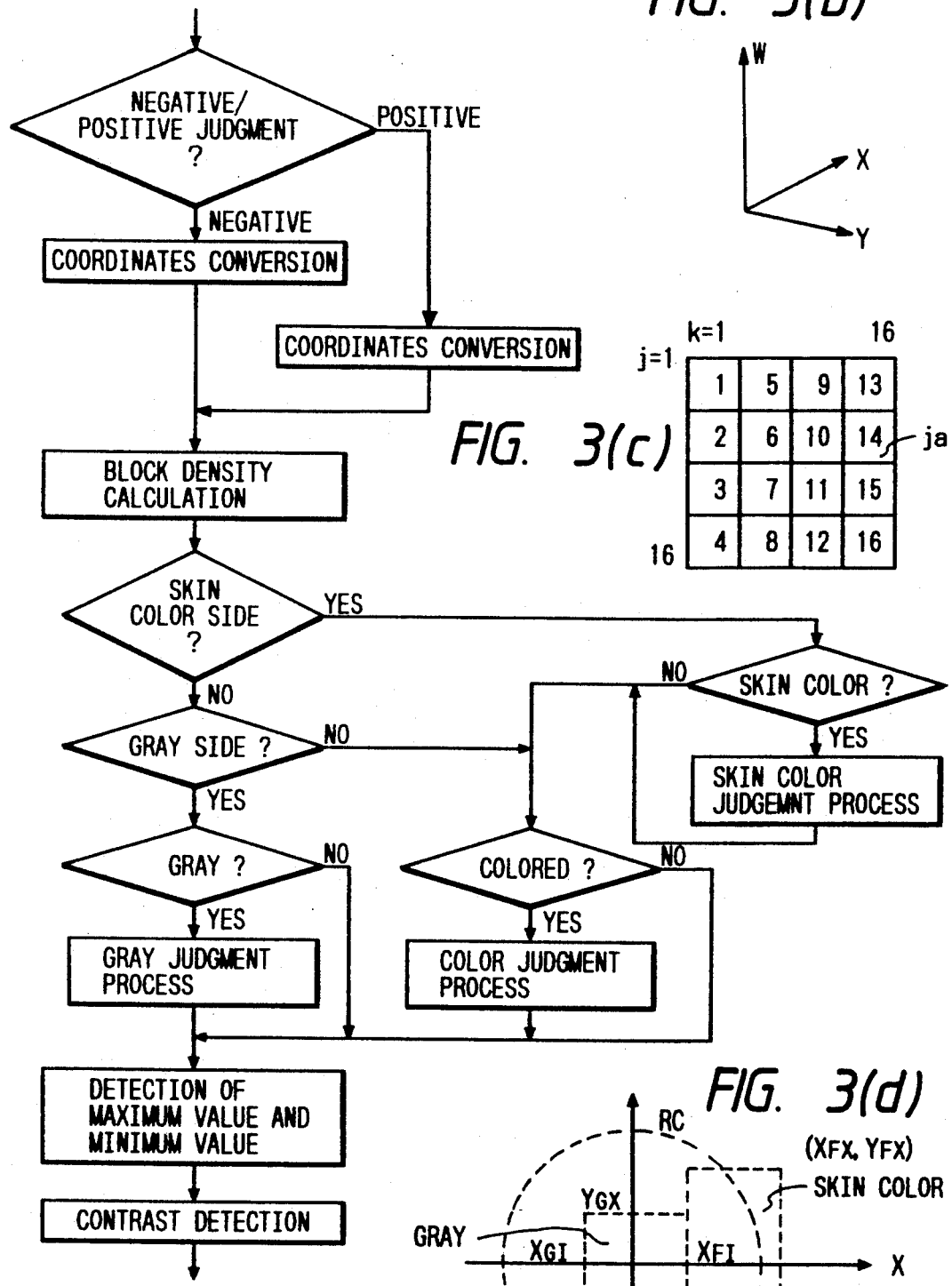

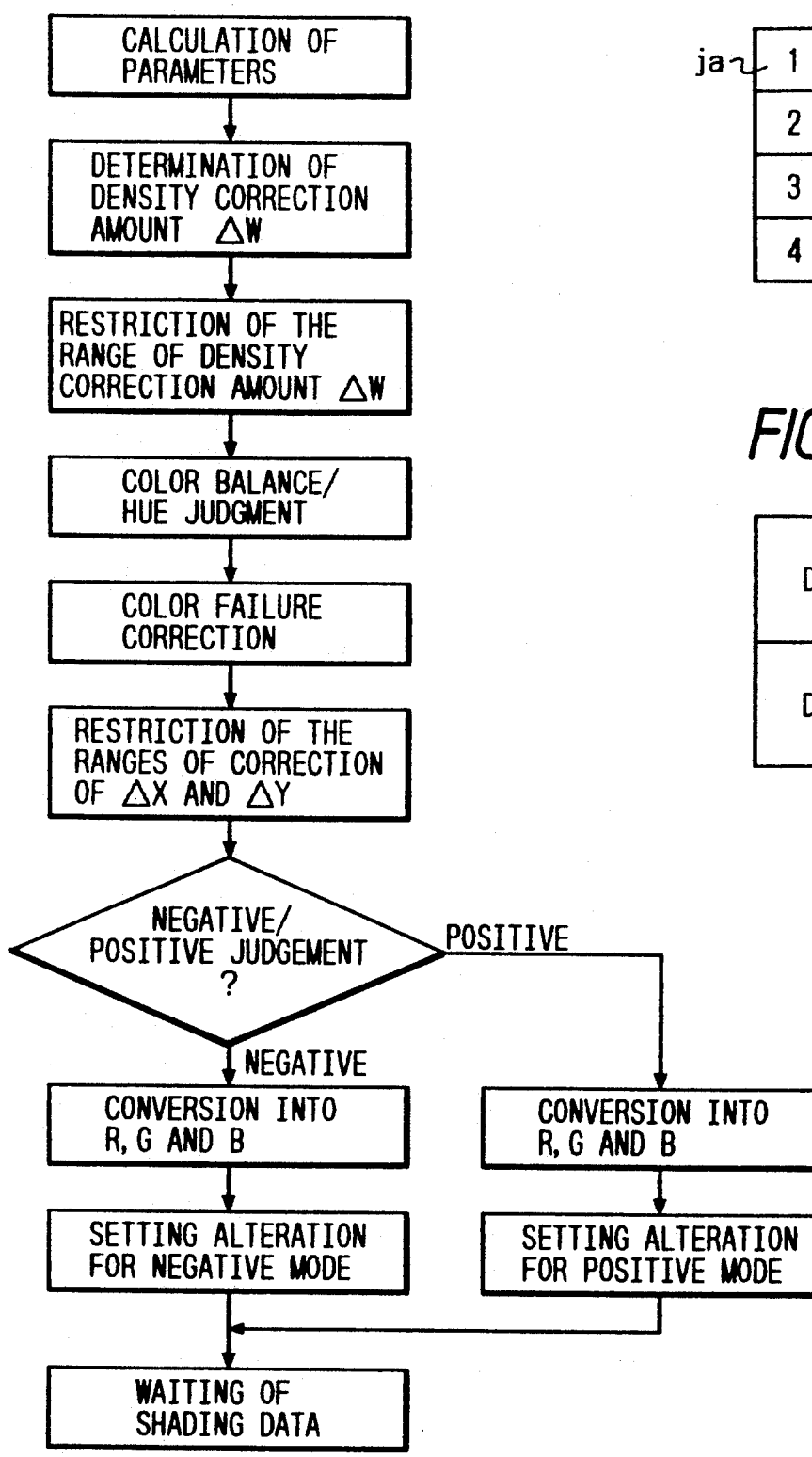

EXTRACTION OF FILM IMAGE PARAMETERS IN IMAGE PROCESSING APPARATUS

BACKGROUND OF THE INVENTION

The present invention relates to extraction of film image parameters in an image processing apparatus which reads and reproduces film images.

In recent years, various film image reading devices have been proposed which produce color copies of film images in a digital color copying machine.

Now, a description is made of a color copying machine as disclosed in, for example, Japanese Patent Application Unexamined Publication Nos. Hei. 2-189073 and Hei. 2-275938, and a film image reading device to be used in combination with such a color copying machine.

FIG. 5 illustrates one example of the overall configuration of a color copying machine, to which the present invention is applied.

The color copying machine has, as a main part, a base machine 30, which consists of a platen glass 31 on the upper surface of which an original document is to be placed, an image input terminal (IIT) 32, an electrical control system housing unit 33, an image output terminal (IOT) 34, a paper tray 35, and a user interface (U/I) 36. The copying machine may be provided additionally with such optional parts as an editing pad 61, an automatic document feeder (ADF) 62, a sorter 63, and a film projector (F/P) 64.

Electrical hardware is necessary for performing control of the IIT 32, IOT 34, U/I 36, and so forth mentioned above. Such hardware items are divided among a plurality of boards for the individual process units such as the IIT 32, an image processing system (IPS) which image-processes output signals from the IIT 32, the U/I 36 and the F/P 64. These boards are housed in the electrical control system housing unit 33, together with other boards such as a SYS board which controls the above process units, and a machine control board (MCB) which controls the IOT 34, ADF 62, sorter 63, and so on.

The IIT 32, which is comprised of an imaging unit 37, a wire 38 for driving the imaging unit 37, a driving pulley 39, and so forth, reads a color original document for each of the primary colors of light, B (blue), G (green) and R (red), using a CCD line sensor and color filters provided in the imaging unit 37, and converts the data thus read into digital image signals to be output to the IPS.

In the IPS, the B, G, and R signals from the IIT 32 mentioned above are converted into the primary color signals of toners, Y (yellow), C (cyan), M (magenta) and K (black), and, in order to enhance the reproduction performance of colors, chromatic gradation, resolution, and so on, various data processing operations are performed on the signals, and then the gradation toner signals of the process colors are converted into binary (on/off) toner signals, which are output to the IOT 34.

The IOT 34, which is provided with a scanner 40 and a photoreceptor belt 41, converts the image signals from the IPS into optical signals in the laser output section 40a, and forms latent images corresponding to the original document image on the photoreceptor belt 41 by means of a polygon mirror 40b, an F/θ lens 40c, and a reflecting mirror 40d. The photoreceptor belt 41, which is driven by a driving pulley 41a, has a cleaner 41b, a charging device 41c, and individual developers 41d for Y, M, C and K, and a transfer device 41e arranged around it. A transfer unit 42 provided in opposite this transfer device 41e takes up a copying sheet as it comes transported from the paper tray 35 via a paper transport channel 35a, and has the toners transferred in the sequence of Y, M, C and K onto the copying sheet, with a transfer belt being rotated four times, for example, in the case of full-color copying of four colors. The copying sheet with the toners thus transferred onto it is then transported from the transfer unit 42 via a vacuum transport device 43 to a fuser 45, where the copying sheet is processed for the fusing of the toners on it and is thereafter discharged. A copying sheet may selectively be fed into the paper transport channel 35a from a single sheet inserter (SSI) 35b.

The U/I 36 is operated by a user for selecting desired functions and for giving instructions as to conditions in execution of the selected functions. The U/I 36 is provided with a color display 51 and a hard control panel 52 mounted by the side of the display 51, and is further combined with an infrared touch board 53, so that instructions may be given directly by operations of soft buttons on the screen.

A film projector (F/P) 64 and a mirror unit (M/U) 65 together form a film image reading unit. FIG. 6 is a perspective view of the F/P 64; FIG. 7 is a perspective view of the M/U 65; FIG. 8 is a chart illustrating the density characteristics of a negative film and the principle of density correction; and FIG. 9 is a chart illustrating the schematic construction of the F/P 64 and the relationship among the F/P 64, M/U 65 and IIT 32.

The F/P 64 has a housing 601, as shown in FIG. 6, and this housing 601 is provided with an operation checking lamp 602, a manual lamp switch 603, an automatic focus and manual focus changeover switch (AF/MF changeover switch) 604, and manual focusing operation switches (M/F operation switches) 605a and 605b. Moreover, the housing 601 is provided with an opening/closing part 606 which can be opened or closed freely, and holes 608 and 609 having sizes large enough to accept a film holding case 607 holding original document films 633 as inserted into the housing 601 either vertically or laterally through them, depending on the manner how objects have been photographed on the films 633. On the opposite side of these holes 608 and 609, there are made other holes (not illustrated) through which the film holding case 607 can protrude.

The film holding case 607 is provided with a case for a 35 mm negative film and positive film, and the F/P 64 is constructed so as to be capable of projecting these types of films. Also, the F/P 64 is constructed so as to be capable of projecting negative films having the size of 6 cm×6 cm and 4 inches×5 inches, respectively. In the latter case, the F/P 64 holds the negative film between the M/U 65 and the platen glass 31 so that the film is kept in close contact with the platen glass 31.

As shown in FIG. 9, a reflector 612 and a light source lamp 613 such as a halogen lamp is arranged on the same axis as a projector lens 610 in the housing 601. In the proximity of the lamp 613 is installed a cooling fan 614, which cools this lamp 613. Furthermore, on the right side of the lamp 613, an aspherical lens 615 for converging the light emitted from this lamp 613, a heat ray absorbing filter 616 for cutting off part of the light in a predetermined wavelength range, and a convex lens 617 are respectively arranged on the same axis as the projector lens 610.

On the right side of the convex lens 617 is installed a correcting filter automatic exchanging device which is provided with a correcting filter holding member 618 which holds density correcting filters 635 for a 35 mm negative film and positive film (only the correcting filter for one of these types of film is shown in the figure), a driving motor 619 for this correcting filter holding member 618, first and second position detecting sensors 620 and 621 for detecting the rotational positions of the correcting filter holding member 618, and a control device for controlling the driving motor 619 (this control device is installed in the F/P 64 but not shown in the figure). The correcting filter automatic exchanging device is constructed so as to make automatic selection of a correcting filter 635 suitable for the original document film 633 out of the correcting filters 635 held on the correcting filter holding member 618, and to set the selected filter in its proper position on the same axis as the individual lenses including the projector lens 610. The correcting filters 635 in this correcting filter automatic exchanging device may be arranged in any place, such as in the space between the platen glass 31 and the imaging unit 37, for example, as long as the location is on the optical axis of the projected light.

In addition, the F/P 64 is provided with an automatic focus sensor light emitter 623 and detector 624 which work in association with the projector lens holding member 611, and a sliding motor 625 which slides the projector lens holding member 611 in relation to the housing 601. When the film holding case 607 is inserted into the inside of the housing 601 either through the hole 608 or the hole 609, the original document film 633, which is held in this film holding case 607, is positioned between the correcting filter holding member 618 and the light emitter 623 and detector 624. In the neighborhood of the position where the original document film 635 is to be set, a film cooling fan 626 is provided for cooling off this original document film 633.

As shown in FIG. 7, the mirror unit 65 is provided with a bottom plate 627 and a cover 628 with one of its ends rotatable engaged with the bottom plate 627. Between the bottom plate 627 and the cover 628 are mounted a pair of supporting pieces 629 and 629 to form a joining link for a frame structure, and these supporting pieces 629 and 629 are so constructed as to support the cover 628 in such a manner that the angle which this cover 628 forms with the bottom plate 627 will be 45 degrees when the cover 628 is opened to its maximum degree.

On the back surface of the cover 628 is provided a mirror 630. A wide opening is formed in the bottom plate 627, and a Fresnel lens 631 and a diffusing plate 632 are provided to close up this opening.

This Fresnel lens 631 and diffusing plate 632 are made of one acrylic resin plate, and the Fresnel lens 631 is formed on the upper surface of this acrylic resin plate while the diffusing plate 632 is formed on its lower surface. The Fresnel lens 631 has the function of preventing the darkening of the peripheral region of the image by transforming the projected rays, which, being reflected by the mirror 630, tend to disperse, into parallel rays. The diffusing plate 632 has the function of diffusing by a little amount the parallel rays from the fresnel lens 631 in order to make non-detectable by a line sensor 226 a shadow of a selfoc lens 224 in the imaging unit 37 which would otherwise be produced by the parallel rays.

In general, the range of the density available on films is wider than the range of density on document originals. Also, the range of density will very depending on the type of film. For example, the range of density on a positive film is wider than that on a negative film. Moreover, the range of density on a film will vary depending on the photographing conditions of an original document film, such as the amount of exposure to light, the density of an object, and the brightness at the time when a photograph is taken. As a matter of fact, the density of an object is in a wide distribution within the range of density of a film.

Therefore, in case it is intended to copy images recorded on such films by means of a copying machine which copies images on an original document using reflected light, a single type of signal processing method could not provide favorable reproduction performance. Therefore, a copying machine is designed, to achieve a favorable reproducing performance, so as to make an appropriate correction on the signals read of images in such a manner that the density of the principal objects will adequately be reproduced.

FIG. 8 illustrates the density characteristics of a certain negative film and the principle of density correction. In this figure, the right half of the horizontal axis represents the amount of exposure from an object (which corresponds to the density of an object), while the left half represents the density after subjected to the shading correction. The upper half of the vertical axis represents the output from the video circuit (the output being approximately equal to the density on the negative film), while the lower half represents the density on an output copy. That is to say, the first quadrant expresses the density characteristics of the negative film; the second quadrant shows the shading correction; the third quadrant indicates of the $\gamma$-correction; and the fourth quadrant indicates the relationship between the amount of exposure of from an object and the density of the output copy as corrected.

The density characteristics of this negative film are indicated by the line alpha in the first quadrant of FIG. 8. Specifically, the more the amount of exposure from an object is, the higher the density of the negative film will be, and, as the amount of exposure from an object decreases, the density of the negative film will become smaller in linear proportion. When the amount of exposure from an object falls below a certain level, the linearity between the amount of exposure from an object and the density of the negative film will be lost. If this amount of exposure is small, it will be impossible, for example, to render a face and hair of a human bust recorded on the film in a proper contrast. Even in case the amount of exposure is large, since the inclination of the line alpha, i.e., $\gamma$ is smaller than one, resultant copy images will have a soft tone unless a $\gamma$-correction is made. Therefore, it is understood that the $\gamma$-correction is required.

Next, a description is made of the principle of corrections with reference to FIG. 8. In the third quadrant in the figure, END (Equivalent Neutral Density) curves $\beta$ are set for the purpose of the $\gamma$-correction. The inclination $\gamma'$ of the END curves $\beta$ is set so as to maintain the relationship, $\gamma' = 1/\gamma$, so that the relationship between the amount of exposure from an object and the density of the output copy will be linear at the angle of 45 degrees in the fourth quadrant.

First, the region a is considered in which case the exposure amount form an object is relatively large. If the density adjusting value set in a register in the shading correction circuit corresponds to the straight line (4) in the second quadrant, the density after the shading correction will be distributed over the region a'. Since the part a" of the region a' will be out of the conversion range of the END curves $\beta$, this part a" will entirely be rendered white in a resultant copy. Thus, the density adjusting value is shifted from the straight line (4) to the straight line (1) in the second quadrant, so that the density after the shading correction is adjusted so as to be within the range of conversion according to the END curves $\beta$. With the adjustment made in this manner, the relationship between the amount of exposure from an object and the density of the output copy will be along the straight line (1) at the angle of 45 degrees in the fourth quadrant, so that the density of a resultant copy will have a proper chromatic gradation.

In the case of the region b, where the amount of exposure from an object is relatively small, linearity in the relationship between the amount of exposure from an object and the density of the negative film will be lost. In this case, the density adjusting value in the shading correction circuit is set in the value of the straight line (4) in the second quadrant, and the END curve $\beta$ indicated by the line (4) in the third quadrant is selected. The selection of this line (4) can hold the amount of exposure from an object and the density of the output copy in the relationship indicated by the straight line (4) at the angle of 45 degrees in the fourth quadrant. That is to say, it becomes possible to produce a distinct contrast between dark hair of a person and a brown hat he wears even if the amount of exposure from an object is in the region b, preventing the hair and the hat from being rendered in almost the same degree of density. Thus, corrections are made in the above manner so that the density of an object is adequately reproduced.

The processing of picture image signals will be described with reference to FIG. 9. A line sensor 226 reads the projected rays of the picture images on the original document film 633 to produce analog image signals representing respective light quantities of R, G and B, and an amplifier 231 amplifies the image signals to prescribed levels. The amplified image signals are then converted into digital signals by an analog-digital (A/D) converter 235, and further a logarithmic converter 238 converts the light quantity signals into the density signal.

The image signals expressed in density are processed for the shading correction by a shading correction circuit 239. This shading correction removes from the image signals irregularity in light quantity caused by the selfoc lens 224, irregularity in sensitivity of individual pixels of the line sensor 226, variations in spectral characteristics and light quantity of the correcting filters 635 and the lamp 613, and components reflecting the effects of changes with the passage of time.

Prior to the performance of this shading correction, a correcting filter for the positive film is first set in case any of the three types of films mentioned above and the registered films has been selected as the original document film. The light quantity signals from the lamp 613 are read with the original document film 633 not yet set, amplified, and converted into digital signals, and finally converted into density signals. Data obtained on the basis of the density signals are stored as reference data in a line memory 240. Specifically, the imaging unit 37 scans 16 lines by stepped scanning to perform sampling for each of the pixels of R, G and B, and the sampling data thus obtained are transferred to a central processing unit (CPU) 634 by way of the line memory 240. The CPU 634 calculates an average density value of the sampling data for the 16 lines, thereby developing the shading data. By thus calculating the average value, errors existing in individual pixels are eliminated.

When images are read from an original document film set in its position, the CPU 634 calculates a density adjusting value $D_{ADJ}$ on the basis of the density data of the negative film as stored in a read only memory (ROM), and rewrites the $D_{ADJ}$ value already set in a register of an LSI in the shading correction circuit 239. Further, the CPU 634 adjusts the intensity of light emitted from the lamp 613 and the gain of the amplifier 643 in correspondence with the selected film.

Then, the shading correction circuit 239 shifts the density values by adding the $D_{ADJ}$ value to the actual data read of the original document film. Furthermore, the shading correction circuit 239 makes the shading correction by subtracting the shading data on individual pixels from the data adjusted above.

When a film is of a type not registered either in the ROM of the CPU 634 or in a random access memory (RAM) of the system, it is necessary to obtain density data of the film from a base film set for it, and to calculate the $D_{ADJ}$ value from the density data thus obtained.

When the shading correction is finished, the IIT 32 outputs the density signals R, G and B to the IPS 33.

Then, the CPU 634 selects an END curve on the basis of the actual data of the original document film, and outputs a correcting signal for a $\gamma$-correction on the basis of the selected curve. Using the correcting signal, the IPS 33 performs the $\gamma$-correction to correct the unsatisfactory contrast performance which would otherwise be caused by the $\gamma$ value being smaller than one and the non-linear characteristics.

However, images photographed on a film with a camera generally have subtle differences which not only result from the type of film, but also depend on various conditions such as the type of camera, the photographing conditions, such as the amount of exposure, set by the person who has taken the photograph, the composition of a picture, and the brightness of a photographed object. For example, even in respect of the photographing conditions alone, the hue on the whole will vary among such cases as a photograph taken under intense rays of the sun in a fine weather, a photograph taken with a stroboscope at night, a photograph taken of a landscape with a high ratio of verdure, a photograph taken of a person, and so forth. Particularly on a photograph taken of a person by stroboscopic photography, the person's figure, which is the principal object, will be rendered in an approximately normal density as the strobe light of a sufficient amount reaches him, but the background around the person's figure is rendered darker on the whole since the strobe light does not reach it.

In order to produce color copies in stable picture quality from images on a film, using a color copying machine, it is necessary to perform such various processes as the color balance adjustment and density adjustment in an appropriate manner on each image since there are delicate differences in such factors as brightness as described above. Therefore, in order to read a color film image and produce copies thereof, it is required to perform a prescanning operation, in advance of a main scanning operation, thereby sampling information on the film image and extracting necessary parameters. In such a case, however, extracting parameters for the image adjustments by sampling image information at various points on the film would require stepped scanning to perform the sampling of data on a plural number of lines. In addition, arithmetic operations would be needed for the collection of data at a plural number of sampling points on each line, the arithmetic operations including the judgment of hue and the determination of the amount of density adjustment at each sampling point. Consequently, the duration of time required for the processing of a single line is extended. That is to say, there arises a problem that prompt services cannot be offered because the duration of time from the start of the operation to the generation of a desired copy output will be prolonged as it is difficult to shorten the prescanning period.

SUMMARY OF THE INVENTION

The present invention has been made to overcome the problems described above, and an object of the present invention is to shorten a prescanning period.

Another object of the present invention is to make it possible to extract necessary parameters for a film image in a short prescanning period.

Still another object of the present invention is to make it possible to perform an adequate density adjustment without impairing the reproduction performance of a human image.

The present invention resides in an apparatus provided with, as shown in FIG. 1, an image reading means 1 which, being comprised of a film projector, a mirror unit and a line sensor, reads a film image, an adjusting means 2 which performs a gain adjustment and an offset adjustment on the image data read by the image reading means, converts the analog image data into digital image data, and performs adjustments such as a shading correction, a processing means 3 which performs an equivalent neutral density conversion, a color conversion and other editing processes on the image data thus converted and adjusted, an output means 4 which reproduces as outputs the image data thus processed for the editing, and a parameter extracting and setting means 5 which extracts parameters from the image data read by the image reading means 1 and sets the extracted parameters in the adjusting means 2 and the processing means 3, in which apparatus the parameters of the film image are extracted in a prescanning process, and the film image is reproduced in a main scanning process using the parameters thus extracted. The prescanning is performed in the form of stepped scanning composed of a plural number of steps. The parameter extracting and setting means 5 performs its processes dividing those into the two parts, the first part performed during the stepped scanning operation and the second part performed during a period of from the finish of the stepped scanning operation to the start of the main scanning operation. During the stepped scanning operation, the means 6 samples, for each step, a plural number of pixels at each of a plural number of sampling points from the image data of one line, and extracts the data of each sampling point processed for a negative/positive judgment, shading correction and orange mask correction using color decomposition data of the plural number of pixels. During the period of from the end of the stepped scanning operation to the start of the main scanning operation, the means 6 calculates correcting values for the film image, completes the extraction of parameters, and sets the parameters. As described above, since the operation performed at each step is nothing more than extracting the data of the respective sampling points, an interval between adjacent steps can be reduced. In addition, the correcting values for the film image are calculated to complete the parameter extraction and the extracted parameters are set during a back scanning operation after completion of the stepped scanning operation.

Moreover, according to the present invention, the parameter extracting and setting means 5 converts the color decomposition hue/density data, judges on the basis of the hue/density whether each block belongs to a gray area or a colored area or a skin color area, and determines the amount of density correction on the basis of the type of each block thus judged. The amount of the density correction is restricted in accordance with the number of blocks which belong to the skin color area. Moreover, the blocks are integrated into second blocks, and to determine the amount of the density correction, the level of exposure and the degree of contrast is judged by calculating the maximum density and the minimum density, the difference in density, the average density, and the deviation of density. Therefore, the amount of the density correction can be determined according to the proportion among the gray area, colored area and skin color area, and the distribution of density, etc., thereby improving the reproduction performance of film images.

BRIEF DESCRIPTION OF THE DRAWINGS

FIGS. 3(a) through 3(d) illustrate calculation/hue judgment process;

FIGS. 4(a) through 4(c) illustrate correction judgment and setting alteration process;

DETAILED DESCRIPTION OF THE PREFERRED EMBODIMENTS

In the following, a description is made of preferred embodiments of the present invention with reference to the accompanying drawings.

Figure 1:
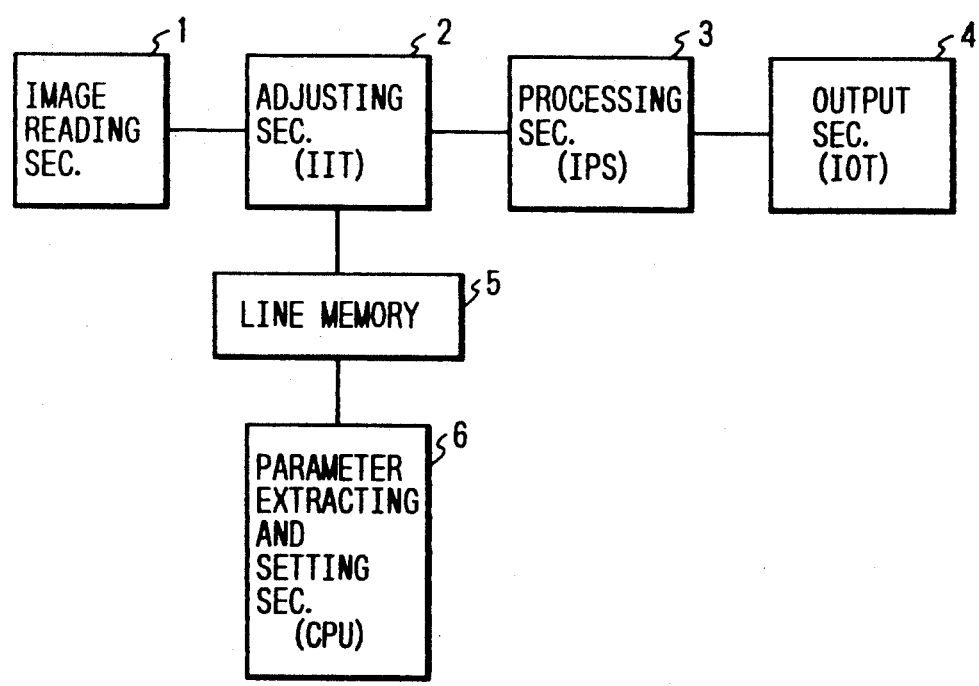
FIG. 1 illustrates a chart illustrating a film image parameter extracting system in an image processing apparatus according to an embodiment of the present invention.

FIG. 1 illustrates one embodiment of a film image parameter extracting system in an image processing apparatus. FIG. 2 illustrates the flow of processes for extracting parameters of a film image.

In FIG. 1, reference number 1 indicates an image reading section; 2, an adjusting section; 3, an editing section; 4, an output section; 5, a line memory; and 6, a parameter extracting and setting section.

As shown in FIG. 1, the image reading section 1 is constructed, for example, by a CCD line sensor, and can read an image on a film when it is operated in combination with a film image reading device comprised of a film projector (F/P) and a mirror unit (M/U) as described above. The adjusting section 2 performs such processes as automatic gain control (AGC), automatic offset control (AOC), analog-digital (A/D) conversion, γ-correction, shading correction, density adjustment, and so forth on the image data read by the image reading section 1, and thus this adjusting section corresponds to the image input terminal (IIT) described above. The processing section 3 performs such processes as equivalent neutral density (END) conversion, color correction, color conversion, under-color removal, smoothing, edge emphasis, and other image editing processes, and thus corresponds to the image processing system (IPS) described above. The output section 4 outputs as color copies the picture image data processed by the processing section 3, and thus corresponds to the image output terminal (IOT) described above. The line memory 5 stores the image data of one line as read by the image reading section 1, and also stores shading data. The parameter extracting and setting section 6, which corresponds to, for example, one of the functions of a CPU for the control of the whole system, extracts necessary data at the time of a prescanning operation by sampling the image data read by the image reading section 1 and supplied through the line memory 5, and extracts parameters and sets the extracted parameters in the line memory 5 before the start of a main scanning operation.

In the system of extracting the film image parameters as proposed in the present invention is designed to the data film image from the image reading section 1 are sampled and provided to the parameter extracting and setting section 6 by way of the adjusting section 2 and the line memory 5 in the prescanning process, as shown in FIG. 1. The parameter extracting and setting section 6 extracts the parameters and sets the extracted parameters in the line memory 5 in the period of from the finish of the prescanning operation to the start of the main scanning operation. With this construction, the invention improves the reproduction performance of film images.

Figure 2A:
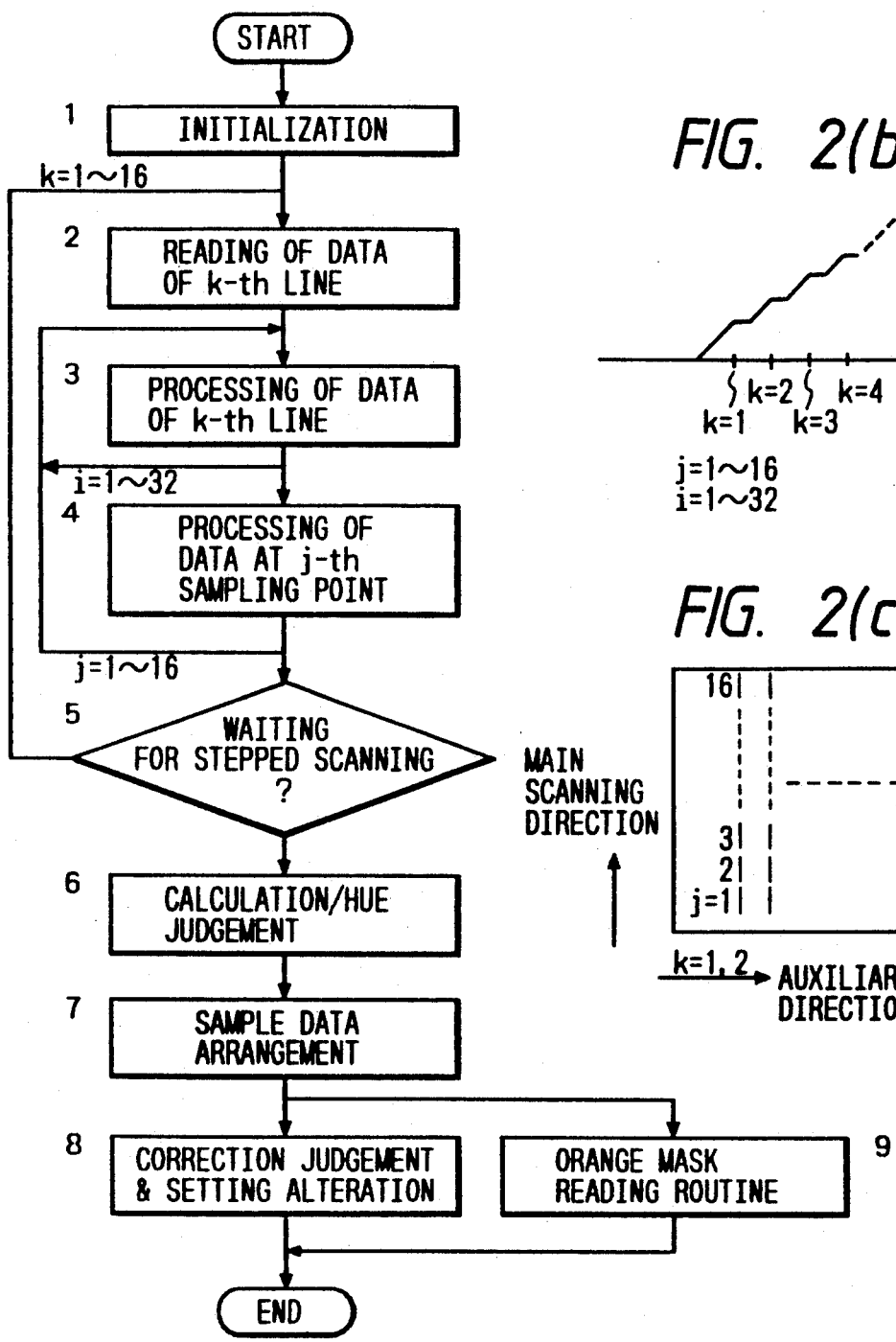
FIGS. 2(a) through 2(c) illustrate the flow of processes for extracting parameters of a film image.

As shown in FIG. 2(a), in the prescanning process, stepped scanning is performed on k=16 lines, and data are sampled at a total of 256 points (j=16 points per line). At each sampling point, i=32 pixels are extracted. Therefore, in case the pixel resolution is 16 dots/mm, for example, one sampling point will be 2 mm in length in the main scanning direction. The data of these 32 pixels are taken in at every sampling point, and image information necessary for the extraction of the parameters are generated. Only such a sampling operation is carried out at 16 points on one line, and thereafter the scan advances by one step. Then, when the stepped scanning operation for 16 lines is finished, a back scanning operation is performed for a shift to the main scanning operation. During the back scanning operation, the extraction and setting of the parameters are performed on the basis of the image information obtained at the individual sampling points.

Figure 2B:
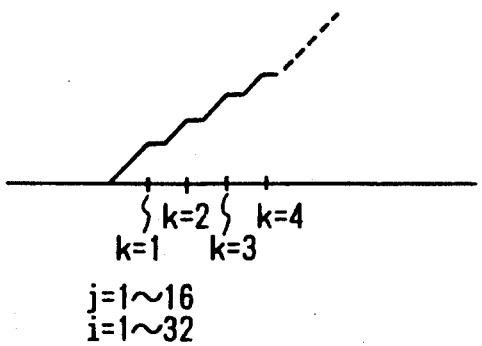
Figure 2C:
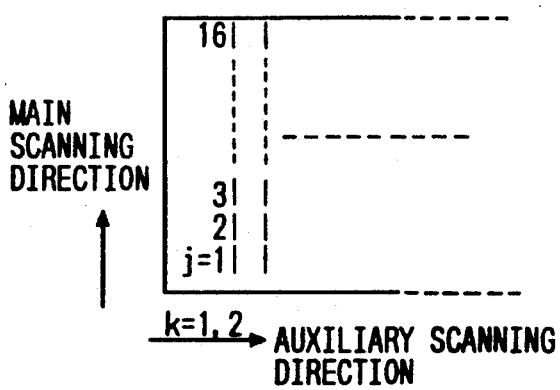
Figure 5:
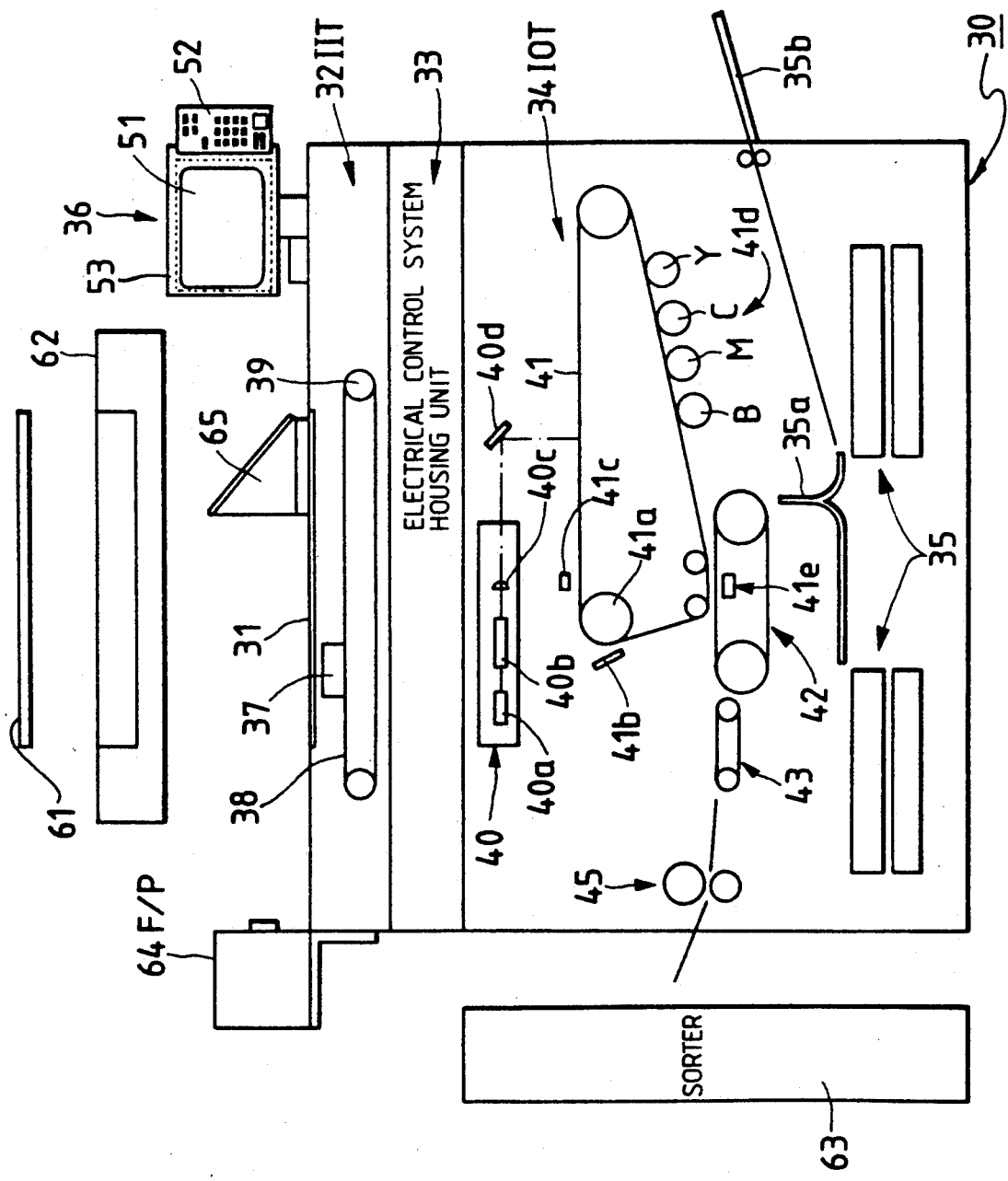
FIG. 5 illustrates one example of the overall construction of a color copying machine.
Figure 6:
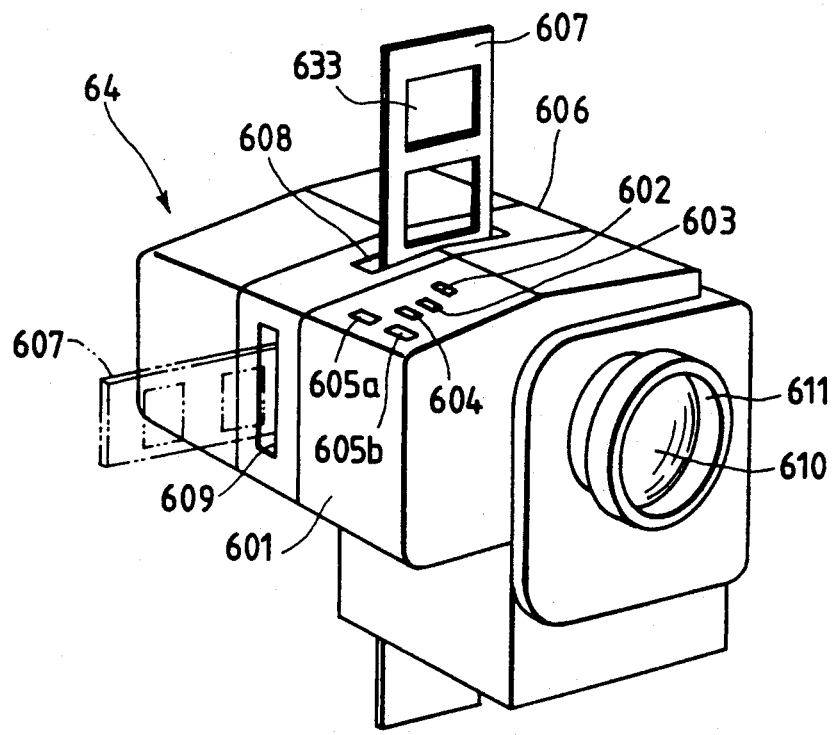
FIG. 6 is a perspective view of a film projector (F/P)
Figure 7:
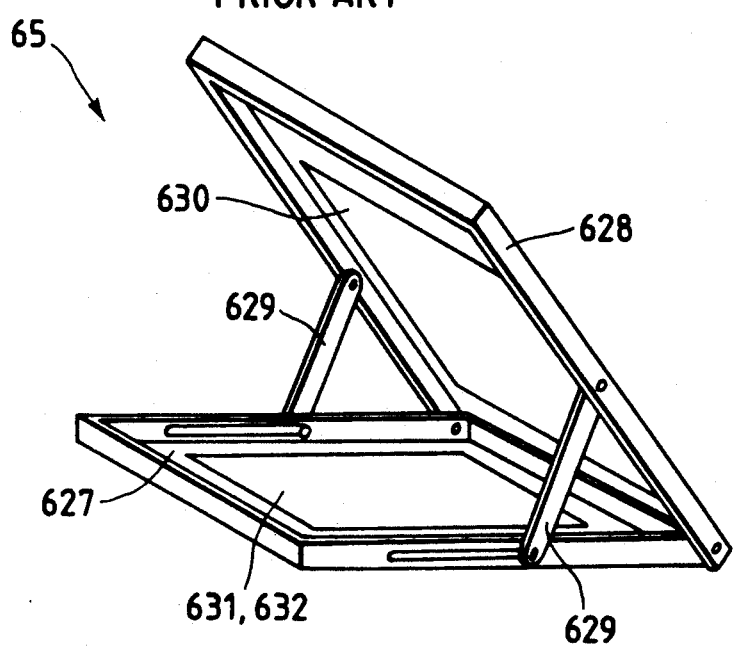
FIG. 7 is a perspective view of a mirror unit (M/U)
Figure 8:
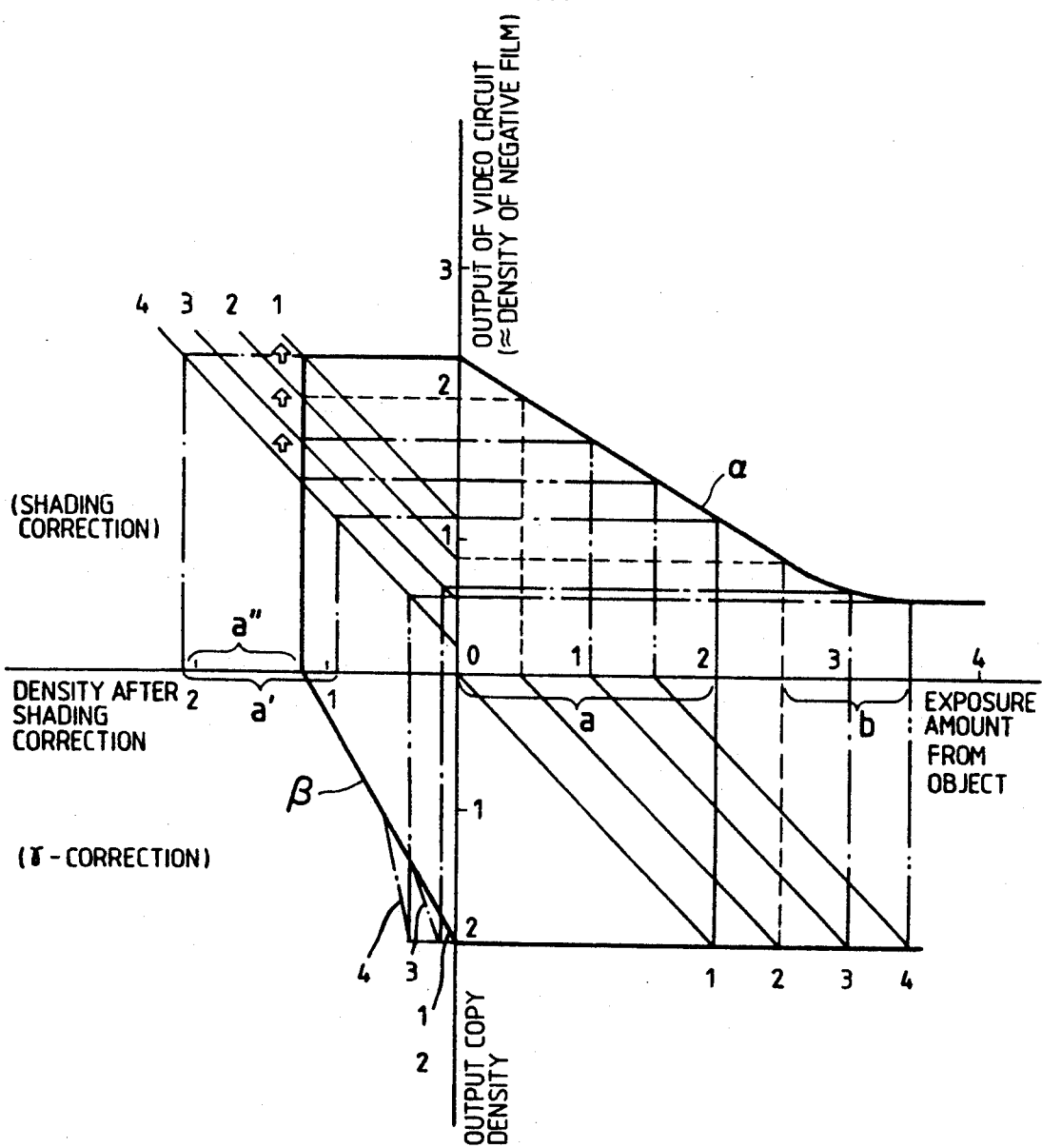
FIG. 8 illustrates the density characteristics of a negative film and the principle of density correction.
Figure 9:
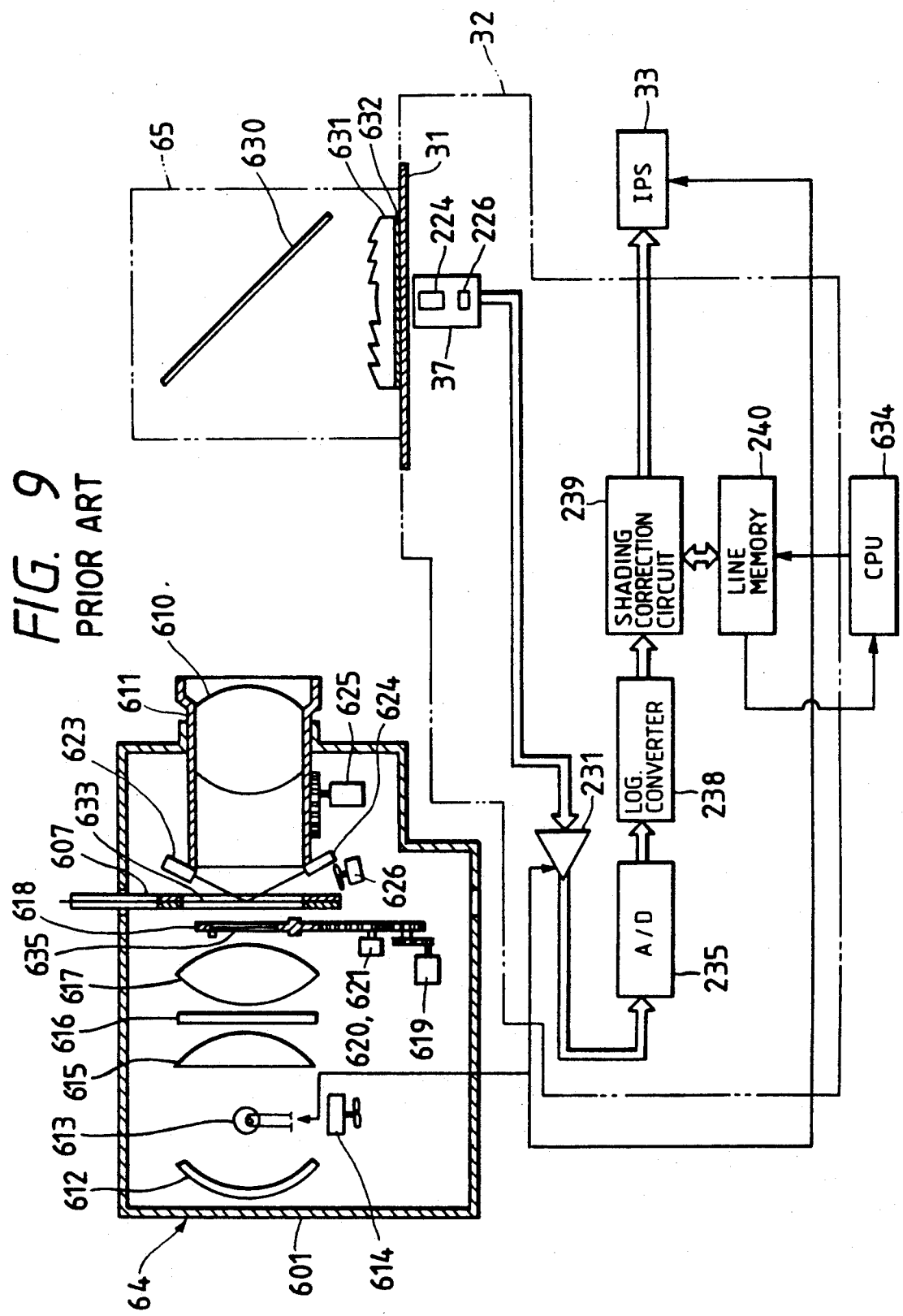
FIG. 9 illustrates the schematic construction of the F/P and the relationship among the F/P, the M/U and an IIT.

The overall flow of the above process is illustrated in FIGS. 2(a) through 2(c). As shown in FIG. 2(a), the data of 16 lines are provided line by line to the line memory 5 after an initializing operation is first performed (steps (1), and (2) through (5)) In this case, stepped scanning is performed on the line k=1, 2, ..., 16, as shown in FIG. 2(b), and, every time the data on each line are read and provided to the line memory 5, the data of i=1 through 32 pixels are added up at each of the sampling points of j=1 through 16 on each line, as shown in FIG. 2(c). Then, the data of 256 points are extracted with correcting and averaging operations performed on the data thus added up (steps (3) and (4)).

Now, assume here that values of the data read of the individual pixels are expressed as $R_i$, $G_i$ and $B_i$ while shading data corresponding to the respective pixels are expressed as $S_{Ri}$, $S_{Gi}$ and $S_{Bi}$. In the processing of the data at each sampling point (step (3)), the following arithmetic operations are performed after the i-th data $R_i$, $G_i$, and $B_i$ at the j-th sampling point are transferred from the line memory 5:

$$\bar{R} = \bar{R} + R_i - S_{Ri}$$

$$\bar{G} = \bar{G} + G_i - S_{Gi}$$

$$\bar{B} = \bar{B} + B_i - S_{Bi}.$$

These arithmetic operations are repeated for each of the pixels i=1 through 32 to calculate the cumulative values of 32 pixels for each of R, G and B after subjected to the shading correction.

Then, on each set of these data, the following arithmetic operations are performed in the step (4):

$$\bar{R} = \bar{R} \times 10/32 + 10 \times (O\&D_{AD} + R_{OM})$$

$$\bar{G} = \bar{G} \times 10/32 + 10 \times (O\&D_{AD} + G_{OM})$$

$$\bar{B} = \bar{B} \times 10/32 + 10 \times (O\&D_{AD} + B_{OM}).$$

With these arithmetic operations, offset adjustments and density adjustments $O\&D_{AD}$, and orange mask adjustments $R_{OM}$, $G_{OM}$, and $B_{OM}$ are made according to the negative/positive determination of a film, and the average value for the 32 pixels is thereby calculated. The multiplication by 10 is done above in order to make it easier to perform the subsequent arithmetic operations in the processing of the data.

When the stepped scanning operation of the 16 lines is finished, a calculation/hue judgment process is performed during the back scanning (step (6)) In step (6), the data $\bar{R}$, $\bar{G}$ and $\bar{B}$, which have been obtained as a result of the preceding adjustments such as the shading correction, are converted into hues and densities, and it is judged whether a given area is a gray area, a skin color area, or a colored area, or any other area. Then, information on the hue and density of each area, and the number areas is generated.

In the process for arranging the sample data (step (7)), the average values of the hues and the densities are calculated on the basis of the information obtained in the calculation/hue judgment process (step (6)), and also the average contrast and so forth are obtained. Then, the amount of density correction ΔW is determined in the correction judgment and setting alteration process (step (8)) by judging the degree of the deviation of density, the extent of exposure, the degree of contrast, and so on. Then, the shading data are generated after performance of the color balance judgment, the hue judgment, the color failure correction, etc., and written into the line memory 5.

Next, a detailed description is further made of the calculation/hue judgment process mentioned above and the processes subsequent thereto.

FIGS. 3(a) through 3(d) illustrate of the calculation/hue judgment process (step (6)), and FIGS. 4(a)

through 4(c) illustrate of the correction judgment and setting alteration process (step (8)).

In the calculation/hue judgment process, as shown in FIG. 3(a), the negative/positive judgment process is first performed, and then the coordinates converting process into the hue and density coordinates is performed. As shown in FIG. 3(b), the coordinates for the hue and density are expressed with the density W represented by the axis W in the vertical direction and the hue by the axes X-Y which crosses at right angles with the axis W. Since the density ranging from white to black is expressed along the axis W, an area around the axis W and having small values with reference to the axes X-Y will be a gray area while an area with large values on the axes X-Y will be a colored area. Then, the data $\bar{R}$, $\bar{G}$ and $\bar{B}$ which have been obtained as average values of the 32 pixels and processed for the corrections are subjected to the coordinates conversion by the following matrix arithmetic operations for a negative film:

$$\begin{pmatrix} X \\ Y \\ W \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} \bar{R} \\ \bar{G} \\ \bar{B} \end{pmatrix}.$$

Further, the average offset correction is performed as following:

$$\begin{pmatrix} X \\ Y \end{pmatrix} = \begin{pmatrix} X \\ Y \end{pmatrix} - \begin{pmatrix} Y_{PFON} \\ Y_{FPON} \end{pmatrix}.$$

On the other hand, the negative-positive reversing process is first performed in the case of a positive film by the following arithmetic operations:

$$\bar{R} = R_{np} - \bar{R}$$

$$\bar{G} = G_{np} - \bar{G}$$

$$\bar{B} = B_{np} - \bar{B}.$$

Then, the coordinates conversion and the average offset correction are performed in the same way as with a negative film.

By the processes described above, the conditions for the hue judgment have been established in negative film terms, in which the $\gamma$-correction matching the negative film and the color turbidity correction by a color correction have been made. Thus, as shown in FIG. 3(c), a block density calculation is performed after dividing the 256 sampling points into blocks ja=1 through 16. In this block density calculation process, the density of each block is calculated and at the same time the degree of dispersion in the vertical direction $\Delta DV$ and the degree of dispersion in the horizontal direction $\Delta D$ are calculated on the basis of the cumulative values of the density differences between adjacent points.

As shown in FIG. 3(d), the hue judgment is performed by setting up $X_{GI}$, $X_{FI}$, $Y_{GI}$, $Y_{GX}$, $X_{FX}$, $Y_{FX}$ and RC as threshold values, and comparing the hue values with such threshold values. The judgment criteria on the X-Y plane are as follows: The gray area is defined by $X_{GI} < X < X_{FI}$ and $Y_{GI} < Y < Y_{GX}$, the area is defined by $X_{FI} < X < X_{FX}$ and $Y < |Y_{FX}|$, the colored area is located outside the circle having the radius RC $(RC^2X^2 + Y^2)$ and excluding the skin color area. That is, those parameters which have a hue in the skin color range on the X-axis are set for the coordinates conversion described above, as it is apparent from the description given above. Therefore, the hue judgment process will first make an affirmative skin color side judgment if the relationship, $X_{FI} < X$, holds valid and hence the hue is on the skin color side. If it is then found that the hue does not belong to the skin color area, the process performs the color judgment. In case the hue is not on the skin color side, the process makes a comparison with $X_{GI}$, $Y_{GI}$ and $Y_{GX}$ and judges whether or not the hue is on the gray side. If the hue is not on the gray color side, then the process makes the color judgment. In case the hue is on the gray side, the process further performs the gray judgment with the density criterion $W < W_G$. That is, the process will not judge that a given data belongs to the gray area if the density W is smaller than the prescribed value $W_G$, even if the hue is located in the gray area in the X-Y plane as shown in FIG. 3(d). Moreover, in case the value of the density W is extremely large or small, the color will be very close to black or white, and, for this reason, an adjustment will be made of the threshold values $X_{FI}$ and $X_{FX}$, which are the threshold values for the gray and skin color area, depending on the value of the density W.

After the area judgment described above, the individual data are added up, and the number of data of the gray color area $n_G$ and the hue $X_G$ and $Y_G$, the hue $X_C$ and $Y_C$ of the colored area, and the number of data of the skin color area $n_F$ and the density $W_F$ are calculated, and subsequently the maximum density WX and its hue XM and YM, the minimum density WI, the overall density LATDW, and the overall hue LATDX and LATDY are obtained.

Conventionally, the processes up to this point have been done for every data extraction of one line, namely, for each sampling step. Therefore, it is not possible to advance the scanning forward to the next line unless the calculation/hue judgment process is finished, and it is therefore not possible to increase the speed in the stepped scanning operation. On the other hand, the present invention offers a system which makes it possible to advance the scanning to the next line merely with the performance of the adding and correcting processes on the data at each sampling point, as described above, without performing the calculation/hue judgment process. It is therefore possible to shorten the period of the stepped scanning operation by the time otherwise needed for the performance of the calculation/hue judgment process. In addition, this portion of time is a duration of time which can be amply secured in the period of from the start of the back scanning operation to the start of the main scanning operation, after the completion of the stepped scanning.

In the sample data arrangement (step (7)) after the finish of the calculation/hue judgment process described above in detail, the average density LATDW and the average hue $\Delta X$ and $\Delta Y$ are obtained by dividing the overall density LATDW and the overall hue LATDX and LATDY by 256. Further, the average gray value is obtained by dividing the hue $X_G$ and $Y_G$ of the gray color area by the number $n_G$, and the average density of the skin color density is obtained by dividing the density $W_F$ of the skin color area by the number $n_F$. Furthermore, the average density difference, the density difference in the horizontal direction, and the density difference in the vertical direction are calculated.

In the correction judgment and setting alteration process, the blocks as shown in FIG. 3(c) and FIG. 4(b) are integrated further into four blocks as shown in FIG. 4(c), and densities D1 through D4 in the respective blocks, an average density DC of the central part (ja=6, 7, 10 and 11) and an average density DF of the peripheral blocks, a difference between the central part density and the peripheral blocks density CF=DC−DF, a difference between the maximum density and the minimum density CN=WX−WI, a difference between the overall average density LATDW and the median value between the maximum density and the minimum density CP=WI+(CN/2)−LATDW, and differences on the diagonal lines between the average densities of the four blocks UL (|D1−D4|, |D2−D3|) are obtained.

Then, on the basis of these values, under-exposure, over-exposure, proper exposure low contrast, and proper exposure high contrast are judged. In this regard, a case which does not come under any of these is dealt as a standard mode. For example, the judgment of the under-exposure is performed by comparing the value of the maximum density WX or the average density LATDW with a prescribed threshold value, and the judgment of the over-exposure is performed by comparing the value of the minimum density WI or the average density LATDW with a prescribed threshold value. The judgment of the proper exposure low contrast is performed by comparing the difference CN of the maximum density and the minimum density and the degree of deviation of the average density (CP, LATDW) with prescribed thresholds, on condition that the case is neither the under-exposure nor over-exposure. The judgment of the proper exposure high contrast is performed on the basis of a result of the comparison of the difference CN between the maximum density and the minimum density with a threshold value on condition that the case does not come under any of the categories mentioned above. Then, the parameters are selected on the basis of a result of the above judgment and the number $n_F$ of the skin color area, and the amount of density correction $\Delta W$ is determined. This amount of density correction $\Delta W$ is determined, for example, by applying weights, in accordance with the judgment of the mode described above, to the maximum density WX and the minimum density WI, the density difference between the central part and the peripheral blocks CF, the density differences on the diagonal lines UL, the average density difference DB, and the number of the gray color area $n_G$, or by applying weights, in accordance with the number of the skin color area $n_F$, to the average density LATDW and the density W of the skin color area. Here, in the weighting in accordance with the number of the skin color area $n_F$, it is usual to place some restraint on the amount of correction for those images in which a human figure is a principal object.

With the amount of density correction $\Delta W$ determined by the procedure described above, the range of the amount of density correction is divided into sections after an addition or a subtraction of a density set by a manual density setting mode has been made. The amount of density correction is limited by the application of functions corresponding to the respective sections. Further, individual processes of color balance/hue judgment, color failure correction, and restrictions of the ranges of correction of $\Delta X$ and $\Delta Y$ are performed in the same manner as in the conventional procedure. Then, on the basis of the amounts of color balance correction $\Delta X$ and $\Delta Y$ and the amount of density correction $\Delta W$ which have been obtained above, the amounts of density correction for each of the colors R, G and B (i.e., $\Delta R$, $\Delta G$ and $\Delta B$) by performing the following calculation in the case of a negative film:

$$\begin{pmatrix} \Delta R \\ \Delta G \\ \Delta B \end{pmatrix} = \begin{pmatrix} a_{11} & a_{12} & a_{13} \\ a_{21} & a_{22} & a_{23} \\ a_{31} & a_{32} & a_{33} \end{pmatrix}^{-1} \begin{pmatrix} \Delta X \\ \Delta Y \\ \Delta W \end{pmatrix}.$$

In addition, the gain of the amplifier and the voltage of the lamp are changed, and with a changeover of tables for the END curves, the shading data are written into the line memory 5. On the other hand, in the case of a positive film, the reverse conversion process is of course performed in the same manner by applying the parameters suitable for this type of film.

The present invention is not limited to the preferred embodiments described hereinabove, but may be applied in various modified forms. For example, in the above embodiment, the color decomposition signals at each point are added up on a line basis, but this process may be arranged to further calculate the hue, density, maximum value, and minimum value at each point.

As is clearly observed in the above description, according to the present invention, such data as the cumulative sum of the color decomposition signals, the hue, and the density are obtained at each of the sampling points on a line basis, and therefore the duration of time required for the sample scanning operation can be shortened. For the reading of a film image and the output of copies thereof, the system of the invention makes it possible to determine the amount of density correction after performance of the calculation/hue judgment process and to set the shading data and other parameters without increasing the time particularly for the performance of the necessary processes, since system can effectively use the duration of the back scanning operation of the scanner to its home position after the completion of the sample scanning operation, and also the duration of time required for the scanner to arrive at the position from which it starts reading a film.

What is claimed is:

1. An image processing apparatus comprising:
   image reading means for reading an image of a film to produce color decomposition data by scanning a plurality of lines on the film image in a stepped prescanning operation;
   memory means; and
   parameter extracting and setting means for, during the prescanning operation, sampling and adding the color decomposition data of a plurality of pixels at each of a first plurality of sampling points on a line-by-line basis and averaging the added color decomposition data, corrections including a shading correction being performed concurrently with the adding and averaging of the color decomposition data, and for, during a period of from an end of the prescanning operation to a start of a main scanning operation, from the averaged color decomposition data, determining a density correction amount and responsive to said density correction amount calculating parameters to be used for correcting the film image in a succeeding actual image processing operation, and setting the calculated parameters in the memory means.

2. The apparatus according to claim 1, wherein the corrections performed by the parameter extracting and setting means during the prescanning operation includes an offset and density adjustment and an orange mask correction in accordance with a negative/positive type of the film.

3. The apparatus according to claim 1, wherein the parameter extracting and setting means converts the averaged color decomposition data into hue/density data, calculates first block density data of respective first blocks each consisting of a second plurality of the sampling points on the basis of the hue/density data, makes a color area judgment as to whether each block density data belongs to a gray area, a colored area or a skin color area, and determines the density correction amount on the basis of a result of the color area judgment.

4. The apparatus according to claim 3, wherein the parameter extracting and setting means limits the density correction amount in accordance with a number of the first blocks whose first block density data belong to the skin color area.

5. The apparatus according to claim 1, wherein the parameter extracting and setting means calculates second block density data of respective second blocks each consisting of a third plurality of the sampling points, judges a degree of exposure and a degree of contrast by calculating a maximum and a minimum, an average and a deviation of the second block density data, and differences within the second block density data, and determines the density correction amount on the basis of a result of the judgment on the exposure and contrast.

* * * * *